Jan. 16, 1968  J. G. FONTAINE  3,363,712
VEHICLE SEAT BELT CONTROL MEANS
Filed Feb. 9, 1966

INVENTOR.
JOHN G. FONTAINE
BY
ATTORNEY

United States Patent Office 3,363,712
Patented Jan. 16, 1968

3,363,712
VEHICLE SEAT BELT CONTROL MEANS
John G. Fontaine, 500 NE. 35th St.,
Fort Lauderdale, Fla. 33308
Filed Feb. 9, 1966, Ser. No. 526,208
3 Claims. (Cl. 180—82)

ABSTRACT OF THE DISCLOSURE

A vehicle seat belt controlling means comprising, a belt composed of two sections for connection together across the body of the user, one of the sections being attached at one end to a fixed bracket and the other section being wound on or unwound from a drum that is biased toward wind-up of the belt section by means of a spring. The drum carries a ratchet wheel and a pivoted pawl is provided with a tooth that is normally disengaged from the ratchet wheel by the bias of a spring. A solenoid is coupled to the pawl and is effective to hold the pawl in an engaged position with the ratchet wheel while the solenoid is energized and which occurs while the ignition switch of the vehicle remains in an "on" position.

---

Figure 1:
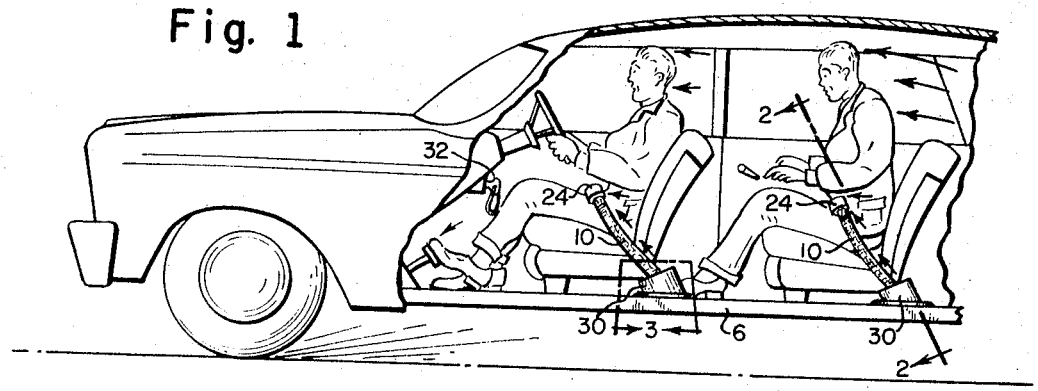

This invention relates to a vehicle seat belt control means and comprises a seat belt of conventional construction, having a connecting buckle device and with one end of the belt being fixed to a bracket, while the opposite seat belt section is wound and unwound upon a drum that is biased in a winding position by a spring, normally disposed within the drum and with the drum at one end being provided with a ratchet disk and with the disk being engaged with teeth to maintain the drum against unwinding movement under certain circumstances.

The apparatus of this invention is an improvement over my co-pending application, filed Jan. 5, 1965, Ser. No. 423,416.

The apparatus of this invention includes a solenoid winding that is connected to an L-shaped bar, carrying a single tooth that has fitment between any of the teeth of the disk and to be normally energized to swing the bar in a direction toward the teeth of the ratchet and with the bar being normally retracted from the locking engagement with the teeth by a coil spring and with the mechanism being disposed within a rigid housing that is fitted over the mechanism and with the mechanism being rigidly bolted to the floor of the vehicle at one end of the seat or, when the seat belt is used in multiple, for multiple passengers in either the front or back seats, a suitable retracting device is mounted at each end of the seat, in a manner to be presently described.

In the drawings, wherein has been illustrated a preferred form of the device and wherein like characters of reference are employed to denote like parts throughout the several figures.

Figure 2:
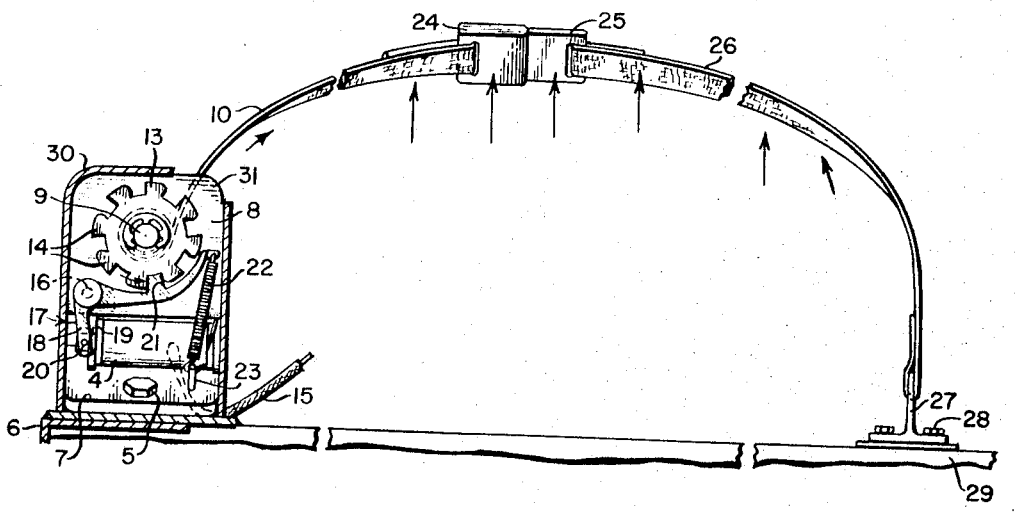
Figure 3:
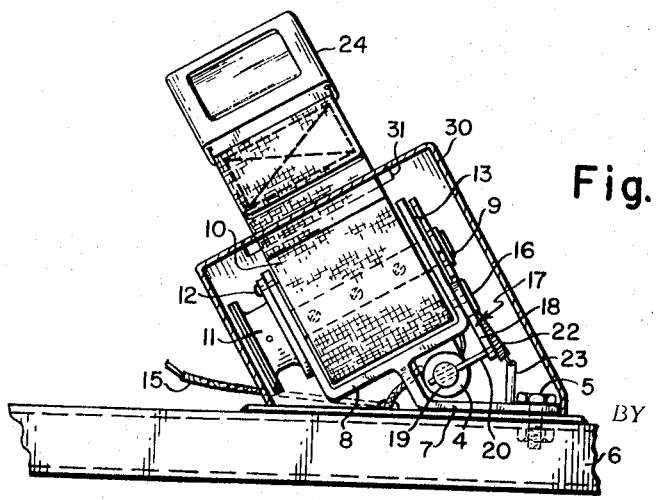

FIGURE 1 is a view partly in section and partly in elevation of a motor vehicle showing the invention applied thereto, FIGURE 2 is a transverse section taken substantially on line 2—2 of FIGURE 1, and FIGURE 3 is a sectional view taken substantially on line 3—3 of FIGURE 1.

Referring specifically to the drawings, bolted at 5 upon the bottom of the vehicle frame 6, is a flat plate 7, carrying an angularly arranged U-shaped bracket 8. Journaled in the end walls 8 of the bracket is a shaft 9, carrying a drum upon which is wound a seat belt section 10. The shaft 9 extends from one side wall 8 of the bracket and is keyed to a winding spring, not shown, disposed in a housing 11 as fixed to the adjacent end wall 8 by a screw or the like 12. The spring functions to wind the shaft 9 in a direction to wind the belt section 10 upon the drum.

Also fixed to the shaft 9 outwardly of one wall 8 is a ratchet disk 13, having relatively square cut teeth 14. Also fixedly attached to the bottom wall of the bracket 8 is a solenoid winding 4, connected to a source of electricity, such as the ignition switch of the vehicle, by a conductor 15. Also pivotally connected at 16, to a forward wall of the bracket 8, is an L-shaped pawl 17 and with one arm 18 being pivotally connected to the core 19 of the solenoid, as indicated at 20. The pawl 17 is arcuately formed and to conform generally to the curvature of the teeth 14 of the disc. The pawl 17 carries a relatively square lug 21 that has normal fitment between the teeth 14 and the pawl 17 is normally baised downwardly, away from the disk 13 by a coil spring 22 and with the lower end of the spring 22 being fixed to a pin 23, carried by the plate 7.

The belt section 10 at its free end is connected to a buckle 24, having interlocking engagement with a buckle section 25 of a belt section 26. The belt section 26 in practice, is adjustable through the buckle section 25 for effectively adjusting the belt sections with respect to each other and for a particular passenger. The belt section 26 is coupled to a fixed bracket 27, bolted or otherwise attached at 28 to the floor of the vehicle, indicated at 29.

In the use of the device, the bracket 8, with its plate 7 is attached to the floor of the vehicle by the bolt 5. With the belt section 10, wound upon the drum, carried by the shaft 9 and, as clearly illustrated in FIGURE 3, the bracket 8 is angularly disposed and the solenoid 4 is then connected to the ignition switch of the vehicle by the conductor 15. With the bracket 8 in assembled relation being mounted upon the floor section 6 of the vehicle, there is disposed over the assembled mechanism, a housing 30. With the housing 30 frictionally engaged with the base plate 7, the belt section 10 is extended through a slot 31 of the housing 30 and with the buckle 24 being disposed outwardly of the housing to facilitate the movement of the belt section 10 to and from a winding and unwinding movement from the drum and the belt section 10 is normally withdrawn from the housing 30 by pulling upon the buckle 24, winding the spring within the spring housing 11 and, with the belt section 26 extended over the waist section of the user, the buckles 24 and 25 are interlocked and at this time, the ignition switch 32 is actuated, to energize the solenoid 4, pulling the arm 18 in a direction to lock a lug 21 into either of the notches of the disk 13. Under normal operating conditions, with the solenoid deenergized, the spring 22 will bias the pawl 17 away from the teeth 14 of the disk.

Under certain conditions when the vehicle is moving in a forward direction and assuming that the flow of current through the conductor 15 has been interrupted, body pressure is exerted against the belt sections 10 and 26, attempting to unwind the belt section 10 from the shaft 9. Since the lug 21 is presently in engagement with the teeth 14, the body pressure will be substantially greater than the pressure of the spring 22 and the lug 21 will be frictionally held in the openings between the teeth 14, effectively preventing the passenger from swinging or moving forwardly under the impact engagement of the vehicle and will effectively prevent damage to the occupants of the vehicle, since the lugs 21 will be held with respect to the teeth 14 and prevent the belt section 10 from feeding outwardly. When the forward direction of the vehicle has been halted, pressure will be relieved upon the belt sections 10 and 26 and permit the spring 22 to rock the pawl 17 downwardly and disengage the lug 21 from the disk 13. In normal use, the solenoid 4 is constantly energized to rock the pawl 17 and to cause the lug 21 to engage either of the teeth 14 and normally, when the current has been interrupted from the conductor 15, the spring 22 will rock the pawl 17 in a direction away from the disk 13, which is a normal position for the pawl 17 and until such time as the ignition switch has been turned on. It will thus be apparent, that the pawl 17 is normally biased away from the disk 13 by the spring 22 but, when the pawl 17 and its lug 21 have been engaged with the teeth 14 by the energizing of the solenoid 4, the belt apparatus is held about the body of the user but, when the solenoid has been deenergized, the pawl 17 remains in locked position with respect to the teeth 14 and, being square in shape, pressure upon the belts 10 and 26 will maintain the belts in their fully protective position about the body of the user.

It will be apparent from the foregoing that there has been provided a novel type of seat belt controlling mechanism that is electrically energized by the ignition switch and will remain in such position until such time as the current has been interrupted. The structure is simple, strong, durable and most effective as a control means for vehicle seat belts.

It is to be understood that the invention is not limited to the precise construction shown, but that changes are contemplated as readily fall within the spirit of the invention as shall be determined by the scope of the subjoined claims.

I claim:

1. A vehicle seat belt control means for controlling belt sections with respect to a vehicle seat and with the belt sections being detachably connected by a buckle device, one seat belt section being anchored to a winding drum biased in a winding direction by a spring device, the winding drum being disposed upon a shaft that is journaled in side walls of a U-shape frame member and with the frame member having a flat base plate rigidly anchored to the floor area of the vehicle seat and with the frame member being covered by a housing that is slotted at its top to permit one seat belt section to be wound or unwound upon the drum, a ratchet device at one end of the frame and a pawl that engages between teeth of the ratchet device and said panel being biased to engagement with the ratchet device by a solenoid, the solenoid device being connected to a conductor that extends to and is connected to an ignition switch of the vehicle so that the pawl is engaged with the ratchet device when the ignition is turned on and means for biasing the pawl away from the ratchet when the seat belt sections are separated.

2. The structure according to claim 1 wherein the side walls of the frame are spaced apart and with a bottom wall of the frame being provided with a flat connecting plate that is bolted to the floor area of a vehicle, the frame member being provided with the shaft that is journaled in the end walls of the frame and that projects at one end for connection to the winding spring and also projects from the opposite end of the frame to carry a toothed plate constituting the ratchet device and with the teeth of the plate being formed by cross slots, the solenoid device being fixed to a bottom wall of the frame and energized by the source of energy such as the ignition switch of an automobile, the pawl being pivotally connected to one wall of the frame in substantially the same plane as the ratchet, the pawl being arcuately formed and conforming to the curvature of the ratchet and having a free end biased downwardly by a spring, the pawl having an arm that is pivotally connected to a shaft of the solenoid and whereby the solenoid when energized swings the pawl to a position against the ratchet and with the pawl having a single lug that has fitment into any of the grooves of the ratchet device, the drum adapted to wind and unwind a belt section and with the spring device of the shaft being biased in a direction to wind the belt section upon the drum, the seat belt section extending through a slot of the housing and with the housing being frictionally supported upon the U-shaped frame, the buckle device being separable and connected to a second belt section that is anchored to the floor of the vehicle, the solenoid being energized by the ignition switch of the vehicle after the buckle has been connected and whereby to swing the pawl into interlocking engagement with the ratchet, the solenoid when deenergized permitting the pawl to be withdrawn by its spring to permit the free movement of the first named belt section outwardly and, with the solenoid being deenergized and with the buckle in connection, the lug of the pawl is held within a selected groove of the ratchet by the pressure of the body of the user and to maintain the pawl in engagement with the ratchet against the tension of its retracting spring.

3. A seat belt apparatus for motor vehicles that comprises a pair of seat belt sections that are coupled together by a buckle when the belts are extended across the body of a person, one belt section being anchored to a floor of the vehicle centrally of the seat, the other belt section extending over the end of the seat and connected to a winding drum that is spring wound in a direction to wind the belt section thereon when the buckle is disconnected, the drum being fixed upon a shaft that is rotatable in a fixed bracket, the shaft extending at one end of the bracket and carrying a toothed ratchet disc having square teeth, a pawl of arcuate shape pivoted to the bracket to swing toward and from the ratchet, the pawl having a single tooth that is adapted to engage between the square teeth, a solenoid connected to and adapted to bias the pawl toward the disc when the solenoid is energized by a source of energy from the vehicle and when the belts are coupled together, retracting means for the pawl when the belts are uncoupled, the said tooth when engaged with the ratchet being forceably held in engagement with the ratchet by a forward body pressure of the passenger when a source of energy to the solenoid has been interrupted, such pressure of the passenger against the coupled belts being greater than the retracting means for the pawl.

References Cited

UNITED STATES PATENTS

| | | | |
|---|---|---|---|
| 3,240,510 | 3/1966 | Spouge | 180—82 |
| 3,294,339 | 12/1966 | Fontaine | 242—107.4 |
| 3,308,902 | 3/1967 | Carter | 180—82 |
| 3,311,409 | 3/1967 | Fisher | 297—388 |

KENNETH H. BETTS, *Primary Examiner.*